E. S. SMITH,

Assignor to THE SMITH & GRIGGS MANUFACTURING CO.

Clasp.

No. 9,336.

Reissued Aug. 3, 1880.

Witnesse

J. H. Chunning

A. R. Thompson

The Smith & Griggs Mfg Co.
assignees of Edward S. Smith
Inventor

By atty

Wm. E. Earle

UNITED STATES PATENT OFFICE.

EDWARD S. SMITH, OF WATERBURY, CONNECTICUT, ASSIGNOR TO THE SMITH & GRIGGS MANUFACTURING COMPANY.

CLASP.

SPECIFICATION forming part of Reissued Letters Patent No. 9,336, dated August 3, 1880.

Original No. 171,961, dated January 11, 1876. Application for reissue filed July 2, 1880.

*To all whom it may concern:*

Be it known that I, EDWARD S. SMITH, of Waterbury, in the county of New Haven and State of Connecticut, have invented a new Improvement in Clasps; and I do hereby declare the following, when taken in connection with the accompanying drawings and the letters of reference marked thereon, to be a full, clear, and exact description of the same, and which said drawings constitute part of this specification, and represent, in—

Figure 2:
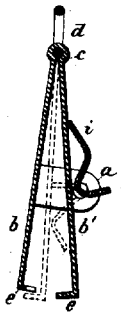
Figure 1:
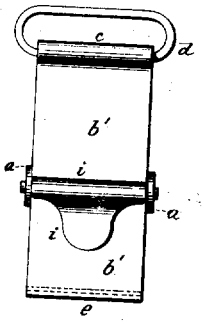
Figure 3:
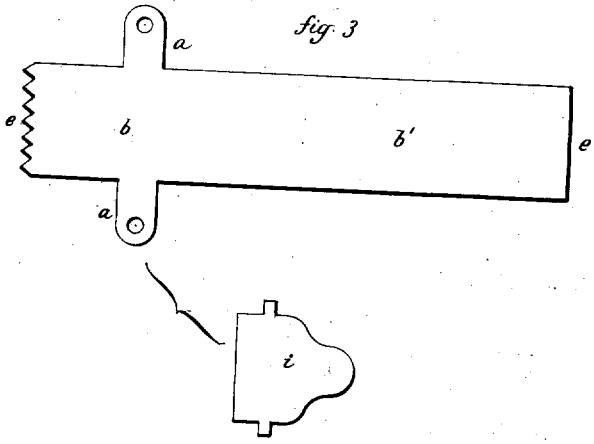

Figure 1, front view; Fig. 2, vertical section; Fig. 3, the blank from which the clasp is formed.

My invention relates to an improvement in clasps designed with special reference to stocking-supports; and it consists in the construction of the clasp, as hereinafter described, and particularly recited in the claim.

From a piece of elastic sheet metal a strip is cut of sufficient length to double about midway of its length to form the two parts *b b'* of a pair of jaws, the ends turned inward, as at *c*. On the one part, as *b*, ears *a* are formed and turned up toward and beside the other part *b'*, to form hinge-bearings for a lever, *i*, the said lever made of cam shape, so as to bear upon the surface of the other part or jaw, and so that by turning the jaw upon its hinge, as seen in broken lines, it will force the other part upon which it bears toward the part to which the lever is hinged, as also seen in broken lines, Fig. 2, which is the grasping condition; and when the lever is returned the elasticity of the metal causes the jaws to spring apart and open their clasping ends. A loop, *d*, is provided at the folded end *c* of the clasp, for the purpose of suspending or attaching the clasp.

I do not broadly claim a pair of jaws connected together at one end and provided with a cam for closing the same, as such, I am aware, is not new; but What I do claim is—

A clasp made from elastic sheet metal, doubled to form a pair of jaws, combined with a lever hinged to one part or jaw and so as to act upon the other jaw, to close or hold the jaws in their closed or clasping condition or permit them to spring apart, substantially as described, and provided with a loop for attaching the clasp.

EDWD. S. SMITH.

Witnesses:

GEO. W. ROBERTS,

J. B. PARTREE.